United States Patent
Yi et al.

(10) Patent No.: US 9,628,316 B2
(45) Date of Patent: Apr. 18, 2017

(54) MULTI-WAVEBAND OFDM RECEIVER, AND FREQUENCY OFFSET COMPENSATION METHOD AND SYSTEM

(71) Applicant: Huawei Technologies Co., Ltd., Shenzhen, Guangdong (CN)

(72) Inventors: Xingwen Yi, Chengdu (CN); Cheng Hong, Chengdu (CN); Huaping Qing, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/010,248

(22) Filed: Jan. 29, 2016

(65) Prior Publication Data

US 2016/0149742 A1     May 26, 2016

Related U.S. Application Data

(63) Continuation of application No. PCT/CN2013/080551, filed on Jul. 31, 2013.

(51) Int. Cl.
*H04J 14/02*     (2006.01)
*H04L 27/26*     (2006.01)
(Continued)

(52) U.S. Cl.
CPC ..... *H04L 27/2659* (2013.01); *H04B 10/6164* (2013.01); *H04B 10/64* (2013.01);
(Continued)

(58) Field of Classification Search
CPC .. H04B 10/6164; H04B 10/64; H04J 14/0298
See application file for complete search history.

(56) References Cited

U.S. PATENT DOCUMENTS 5,748,047 A * 5/1998 Guthrie ............... H03B 21/02
                                          331/16
7,561,807 B2     7/2009 Doerr et al.
(Continued)

FOREIGN PATENT DOCUMENTS

CN     102223340 A     10/2011
CN     102934378 A     2/2013
(Continued)

OTHER PUBLICATIONS

J. Caraquitena et al., "Analysis of Comb Frequency Offset Variations via Phase-Only Line-by-Line Pulse Shaping", Conference on Lasers and Electro-Optics, May 6, 2007, 2 pages.
(Continued)

*Primary Examiner* — Dzung Tran

(57) ABSTRACT

A multi-waveband OFDM receiver and a frequency offset compensation method and system are disclosed. The method includes: performing single waveband frequency offset estimation on an optical comb line of each order; classifying the optical comb lines into a low mutation optical comb line and a high mutation optical comb line; performing joint frequency offset estimation on the low mutation optical comb line; and performing compensation for a frequency offset of a radio frequency drive signal by using an estimated joint frequency offset. The present invention improves accuracy and reliability of the frequency offset estimation of the radio frequency drive signal, so that the degree of the compensation for the frequency offset of the radio frequency drive signal is more comprehensive and accurate.

17 Claims, 4 Drawing Sheets

(51) Int. Cl.
*H04B 10/61* (2013.01)
*H04B 10/64* (2013.01)

(52) U.S. Cl.
CPC .......... *H04J 14/0298* (2013.01); *H04L 27/26* (2013.01); *H04L 27/2657* (2013.01); *H04L 27/2697* (2013.01); *H04L 27/2682* (2013.01)

(56) References Cited

U.S. PATENT DOCUMENTS

| | | | | |
|---|---|---|---|---|
| 9,088,371 | B2* | 7/2015 | Witzens | H04B 10/64 |
| 2003/0091097 | A1* | 5/2003 | Yap | G02F 2/002 |
| | | | | 375/132 |
| 2004/0017833 | A1* | 1/2004 | Cundiff | H01S 3/1112 |
| | | | | 372/18 |
| 2004/0264977 | A1* | 12/2004 | Yap | G02F 2/02 |
| | | | | 398/161 |
| 2006/0251424 | A1* | 11/2006 | Nicholson | G02F 1/365 |
| | | | | 398/141 |
| 2008/0095250 | A1 | 4/2008 | Kim et al. | |
| 2009/0154625 | A1 | 6/2009 | Kwak et al. | |
| 2011/0170873 | A1 | 7/2011 | Liu et al. | |
| 2011/0255864 | A1 | 10/2011 | Cao et al. | |
| 2013/0070874 | A1 | 3/2013 | Nakagawa et al. | |
| 2015/0043864 | A1 | 2/2015 | Sudo et al. | |

FOREIGN PATENT DOCUMENTS

| | | |
|---|---|---|
| WO | WO 2012/150197 A1 | 11/2012 |
| WO | WO 2013/105649 A1 | 7/2013 |

OTHER PUBLICATIONS

C.-B. Huang et al., "Quantitative study of optical frequency noise to intensity noise conversion in line-by-line pulse shaping", IEEE, 2007, p. 924-925.

Satoshi Shimizu et al., Analysis of Frequency Mismatch in All-Optical OFDM Systems, 2012, 3 pages.

Chen-Bin Huang et al., "Quantitative Study of Optical Frequency Noise to Intensity Noise Conversion in Line-by-Line Pulse Shaping", IEEE Journal of Quantum Electronics, vol. 45, No. 6, Jun. 2009, p. 661-673.

Xingwen Yi et al., "Tb/s Coherent Optical OFDM Systems Enabled by Optical Frequency Combs", Journal of Lightwave Technology, vol. 28, No. 14, Jul. 15, 2010, p. 2054-2061.

* cited by examiner

MULTI-WAVEBAND OFDM RECEIVER, AND FREQUENCY OFFSET COMPENSATION METHOD AND SYSTEM

CROSS-REFERENCE TO RELATED APPLICATIONS

This application is a continuation of International Application No. PCT/CN2013/080551, filed Jul. 31, 2013, which is hereby incorporated by reference in its entirety.

TECHNICAL FIELD

The present invention relates to the field of network communications technologies, and in particular, to a multi-waveband OFDM receiver, and a frequency offset compensation method and system.

BACKGROUND

In an orthogonal frequency division multiplexing (OFDM) technology, a channel is divided into several orthogonal sub-channels, a high-rate data signal is converted into a parallel low-rate sub data stream and modulated to each sub-channel for transmission. Currently, the OFDM technology is widely applied to the broadcast audio and video field and the civil communications system, and main applications include: asymmetric digital subscriber loop (ADSL), ETSI standard digital audio broadcasting (DAB), digital video broadcasting (DVB), high definition television (HDTV), a wireless local area network (WLAN), and the like.

In a process of information transmission by means of the orthogonal frequency division multiplexing (OFDM), information needs to be modulated to an optical comb line generated by a transmitter, to form a multi-waveband signal, and signal demodulation is implemented at a receive end by using beat frequency between an optical comb in a receiver and the optical comb line generated by the transmitter. The optical comb line spacing in the transmitter and the optical comb line spacing in the receiver are not exactly the same and an offset exists between them; however, because the spacings are different, performance of the receiver is deteriorated. In the prior art, frequency offset compensation is usually performed on a radio frequency drive signal that is used to generate the optical comb line; however, the existing compensation method has relatively low accuracy.

SUMMARY

Embodiments of the present invention provide a multi-waveband OFDM receiver, and a frequency offset compensation method and system, so as to resolve a problem in the prior art that accuracy of frequency offset compensation for a radio frequency drive signal of a multi-waveband OFDM receiver is not high.

To resolve the foregoing technical problem, the embodiments of the present invention disclose the following technical solutions:

According to a first aspect, a frequency offset compensation method is provided, where the frequency offset compensation method is used to compensate for a frequency offset of a radio frequency drive signal of an optical comb generator of a multi-waveband OFDM receiver, and the method includes the following steps:

S1: performing single waveband frequency offset estimation on an optical comb line of each order to obtain an estimated single waveband frequency offset of the optical comb line of each order, where the optical comb line is a spectral line of an optical frequency comb;

S2: classifying, according to a mutation threshold of a curve of a single waveband frequency offset that is of the optical comb line and that changes with time, an optical comb line whose mutation level of the curve of a single waveband frequency offset that changes with time is less than the mutation threshold as a low mutation optical comb line, and an optical comb line whose mutation level of the curve of a single waveband frequency offset that changes with time is greater than the mutation threshold as a high mutation optical comb line;

S3: performing joint frequency offset estimation by using the estimated single waveband frequency offset of the low mutation optical comb line of each order, to obtain an estimated joint frequency offset; and S4: performing compensation for a frequency offset of a radio frequency drive signal by using the estimated joint frequency offset.

In a first possible implementation manner of the first aspect, after the step S4, the method further includes the following step:

S5: repeating the steps S1 to S4.

In a second possible implementation manner of the first aspect, the step S1 includes:

performing single waveband phase estimation by using the optical comb line of each order and a beat frequency signal of a corresponding signal waveband, to obtain phase information of the optical comb line of each order; and taking a time derivative and performing time averaging on a phase of a training symbol in the phase information of the optical comb line of each order separately to obtain the estimated single waveband frequency offset of the optical comb line of each order.

In a third possible implementation manner of the first aspect, in the step S2, a quantity of mutations of a curve of a frequency offset that is of the optical comb line of each order per unit time and that changes with time is used as the mutation level of the curve of a single waveband frequency offset that is of the optical comb line of each order and that changes with time; and a value range of the mutation threshold of the curve of a single waveband frequency offset that changes with time is greater than two mutations in a frame and less than half of a quantity of information symbols included in a frame.

In a fourth possible implementation manner of the first aspect, the step S2 includes:

when classification of the low mutation optical comb line and the high mutation optical comb line is performed for the first time, if a mutation level of the curve of a single waveband frequency offset that is of the optical comb line of each order and that changes with time is greater than the mutation threshold of the curve of a single waveband frequency offset that is of the optical comb line and that changes with time, classifying a zero-order optical comb line and ±1-order optical comb lines as low mutation optical comb lines, and classifying optical comb lines of other orders as high mutation optical comb lines.

With reference to the second possible implementation manner of the first aspect, in a fifth implementation manner of the first aspect, after the step S2, the method further includes:

performing phase unwrapping on the estimated single waveband frequency offset of the high mutation optical comb line of each order by using the phase information of the low mutation optical comb line; and repeating the steps S1 and S2 by using a single waveband phase, which is obtained by performing the phase unwrapping on the estimated single waveband frequency offset of the high mutation optical comb line of each order by using the phase information of the low mutation optical comb line, as the phase of the training symbol in the phase information of a corresponding optical comb line.

With reference to the first aspect or the fifth possible implementation manner of the first aspect, in a sixth possible implementation manner of the first aspect, the step S3 includes:

performing weighted average on the estimated single waveband frequency offset of the low mutation optical comb line of each order to obtain the estimated joint frequency offset.

With reference to the sixth possible implementation manner of the first aspect, in a seventh possible implementation manner of the first aspect, the performing weighted average on the estimated single waveband frequency offset of the low mutation optical comb line of each order to obtain the estimated joint frequency offset includes:

performing weighted average on a difference between estimated single waveband frequency offsets of adjacent low order optical comb lines in the low mutation optical comb lines of orders to obtain the estimated joint frequency offset.

According to a second aspect, a frequency offset compensation system is provided, including:

a frequency offset estimation module, configured to perform single waveband frequency offset estimation on an optical comb line of each order to obtain an estimated single waveband frequency offset of the optical comb line of each order, where the optical comb line is a spectral line of an optical frequency comb;

a mutation level estimation classification module, configured to classify, according to a mutation threshold of a curve of a single waveband frequency offset that is of the optical comb line and that changes with time, an optical comb line whose mutation level of the curve of a single waveband frequency offset that changes with time is less than the mutation threshold as a low mutation optical comb line, and an optical comb line whose mutation level of the curve of a single waveband frequency offset that changes with time is greater than the mutation threshold as a high mutation optical comb line;

a joint frequency offset estimation module, configured to perform joint frequency offset estimation by using the estimated single waveband frequency offset of the low mutation optical comb line of each order, to obtain an estimated joint frequency offset; and a frequency offset compensation module for a radio frequency drive signal, configured to perform compensation for a frequency offset of a radio frequency drive signal by using the estimated joint frequency offset.

In a first possible implementation manner of the second aspect, the frequency offset estimation module performs single waveband phase estimation by using the optical comb line of each order and a beat frequency signal of a corresponding signal waveband, to obtain phase information of the optical comb line of each order; and takes a time derivative and performs time averaging on a phase of a training symbol in the phase information of the optical comb line of each order separately to obtain the estimated single waveband frequency offset of the optical comb line of each order.

In a second possible implementation manner of the first aspect, the mutation level estimation classification module uses a quantity of mutations of a curve of a frequency offset that is of the optical comb line of each order per unit time and that changes with time as the mutation level of the curve of a single waveband frequency offset that is of the optical comb line of each order and that changes with time; and a value range of the mutation threshold of the curve of a single waveband frequency offset that changes with time is greater than two mutations in a frame and less than half of a quantity of information symbols included in a frame.

In a third possible implementation manner of the second aspect, when the mutation level estimation classification module performs classification of the low mutation optical comb line and the high mutation optical comb line for the first time, if a mutation level of the curve of a single waveband frequency offset that is of the optical comb line of each order and that changes with time is greater than the mutation threshold of the curve of a single waveband frequency offset that is of the optical comb line and that changes with time, a zero-order optical comb line and ±1-order optical comb lines are classified as low mutation optical comb lines, and optical comb lines of other orders are classified as high mutation optical comb lines.

With reference to the first possible implementation manner of the second aspect, in a fourth implementation manner of the second aspect, the frequency offset compensation system further includes:

a phase unwrapping module, configured to perform phase unwrapping on the estimated single waveband frequency offset of the high mutation optical comb line of each order by using the phase information of the low mutation optical comb line, where a single waveband phase obtained by performing the phase unwrapping on the estimated single waveband frequency offset of the high mutation optical comb line of each order by using the phase information of the low mutation optical comb line is used as the phase of the training symbol in the phase information of a corresponding optical comb line and is sent to the frequency offset estimation module for single waveband frequency offset estimation.

With reference to the second aspect to the fourth possible implementation manner of the second aspect, in a fifth possible implementation manner of the second aspect, the joint frequency offset estimation module performs weighted average on the estimated single waveband frequency offset of the low mutation optical comb line of each order to obtain the estimated joint frequency offset.

With reference to the fifth possible implementation manner of the second aspect, in a sixth possible implementation manner of the second aspect, the joint frequency offset estimation module performs weighted average on a difference between estimated single waveband frequency offsets of adjacent low order optical comb lines in the low mutation optical comb lines of orders to obtain the estimated joint frequency offset.

According to a third aspect, a multi-waveband OFDM receiver is provided, where the multi-waveband OFDM receiver includes the frequency offset compensation system.

In the multi-waveband OFDM receiver and the frequency offset compensation method and system in the embodiments of the present invention, optical comb lines are classified into a low mutation optical comb line and a high mutation optical comb line according to a mutation threshold of a curve of a single waveband frequency offset that changes with time and joint frequency offset estimation is performed on an estimated single waveband frequency offset of the low mutation optical comb line of each order, and compensation for a radio frequency drive signal is performed by means of the joint frequency estimation, so that a quantity of optical comb lines for joint frequency offset estimation is increased, thereby avoiding performance deterioration caused by the fact that the high mutation optical comb line participates in the joint frequency offset estimation, and improving accuracy of compensation for a frequency offset of the radio frequency drive signal. In addition, in the method, compensation for the frequency offset of the radio frequency drive signal is performed repeatedly, so that frequency offsets are reduced, and therefore, reliability and comprehensiveness of the frequency compensation for the frequency offset of the radio frequency drive signal are improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following embodiments of the present invention provide a multi-waveband OFDM receiver and a frequency offset compensation method and system, so as to improve accuracy of compensation for a radio frequency drive signal.

To make a person skilled in the art understand the technical solutions in the embodiments of the present invention better, and make the objectives, features, and advantages of the embodiments of the present invention clearer, the following further describes the technical solutions in the embodiments of the present invention in detail with reference to the accompanying drawings.

In a frequency offset compensation method according to an embodiment of the present invention, the frequency offset compensation method is used to compensate for a frequency offset of a radio frequency drive signal of an optical comb generator of a multi-waveband OFDM receiver.

Figure 1:
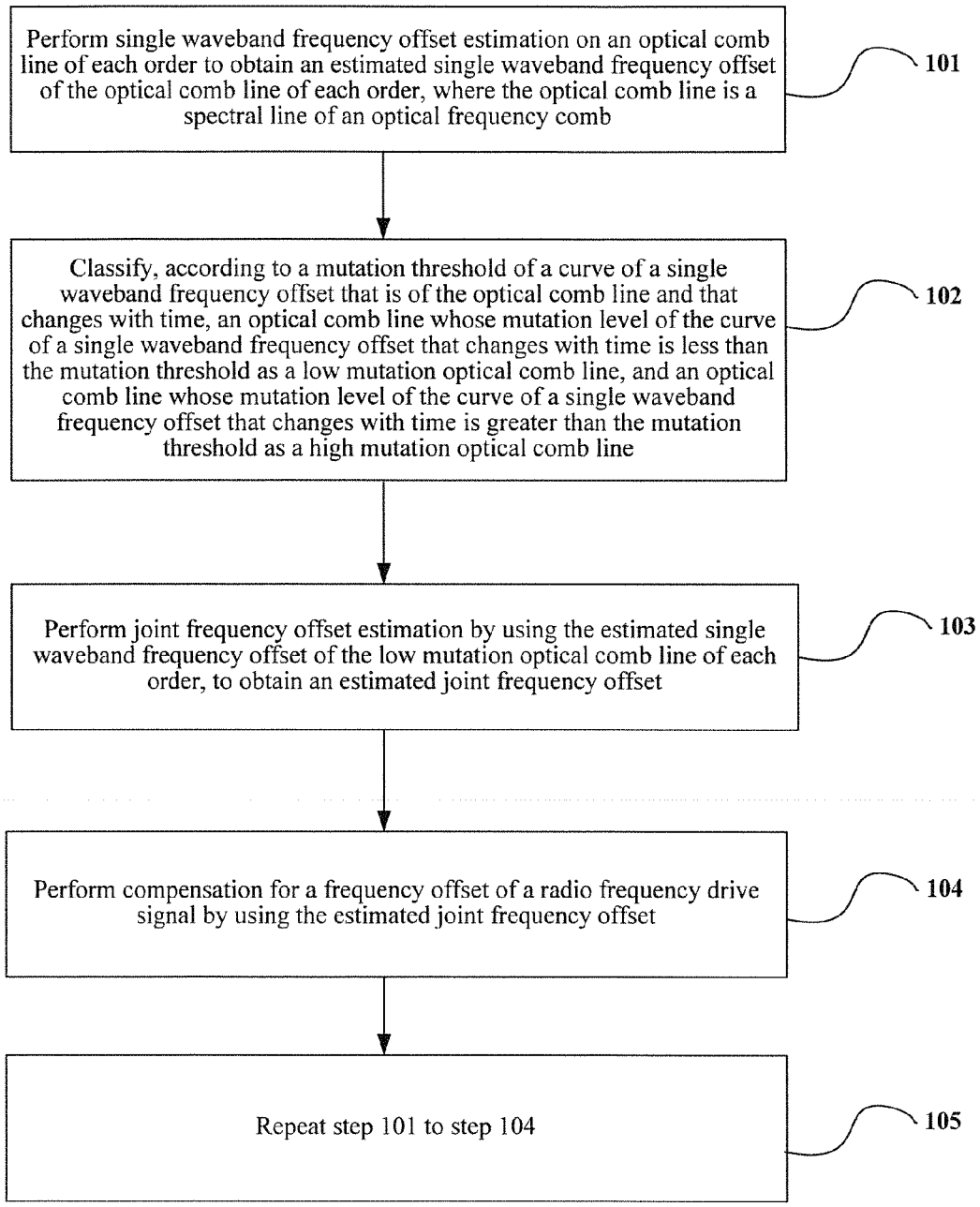
FIG. 1 is a flowchart of an embodiment of a frequency offset compensation method according to the present invention.

Referring to FIG. 1, FIG. 1 is a flowchart of an embodiment of a frequency offset compensation method according to the present invention. As shown in FIG. 1, the method includes:

Step 101: Perform single waveband frequency offset estimation on an optical comb line of each order to obtain an estimated single waveband frequency offset of the optical comb line of each order, where the optical comb line is a spectral line of an optical frequency comb.

The estimated single waveband frequency offset is an estimated value of a difference between a center frequency of an optical comb of an order and a center frequency of a corresponding signal light waveband. The method for performing single waveband frequency offset estimation on an optical comb line of each order includes:

performing single waveband phase estimation by using the optical comb line of each order and a beat frequency signal of a corresponding signal waveband, to obtain phase information of the optical comb line of each order; and taking a time derivative and performing time averaging on a phase of a training symbol in the phase information of the optical comb line of each order separately to obtain the estimated single waveband frequency offset of the optical comb line of each order.

The estimated single waveband frequency offset of the optical comb line of each order may be obtained by using the following formula:

$$E\left[\frac{d\varphi_m}{dt}\right] = \Delta f_m$$

where $\varphi_m$ indicates the phase information of a low order optical comb line, where the phase information is phase information caused by a frequency offset in the beat frequency signal of the corresponding signal waveband and may be obtained by setting a training symbol in the signal waveband and separating the phase information from the beat frequency signal; t indicates time; and $\Delta f_m$ indicates the estimated single waveband frequency offset of an m-order optical comb line, where m indicates an order number of the optical comb line.

Step 102: Classify, according to a mutation threshold of a curve of a single waveband frequency offset that is of the optical comb line and that changes with time, an optical comb line whose mutation level of the curve of a single waveband frequency offset that changes with time is less than the mutation threshold as a low mutation optical comb line, and an optical comb line whose mutation level of the curve of a single waveband frequency offset that changes with time is greater than the mutation threshold as a high mutation optical comb line.

Whether a mutation occurs is determined according to whether a calculated variation of a phase of a corresponding signal of the optical comb line of each order in unit time exceeds a frequency jump threshold, for example, a phase variation $2\pi\pm0.1$ or above $2\pi\pm0.2$ may be used to define whether the mutation occurs. The mutation level of the curve of a single waveband frequency offset that is of the optical comb line of each order and that changes with time indicates a quantity of times of mutations of the curve of a frequency offset that is of the optical comb line of each order per unit time and that changes with time. A person skilled in the art may set the mutation threshold of the curve of a single waveband frequency offset that changes with time according to precision of a selected device, required precision of the frequency offset of the radio frequency drive signal, and an empirical value, and a value range of the mutation threshold of the curve of a single waveband frequency offset that changes with time is greater than two mutations in a frame and less than half of a quantity of information symbols included in a frame.

When classification of the low mutation optical comb line and the high mutation optical comb line is performed for the first time, if a mutation level of the curve of a single waveband frequency offset that is of the optical comb line of each order and that changes with time is greater than the mutation threshold of the curve of a single waveband frequency offset that is of the optical comb line and that changes with time, a zero-order optical comb line and ±1-order optical comb lines are classified as low mutation optical comb lines, and optical comb lines of other orders are classified as high mutation optical comb lines.

In this embodiment, because a mutation of the curve of a single waveband frequency offset that is of the high mutation optical comb line and that changes with time is relatively large, and frequently occurred mutations cause serious signal distortion; therefore, reliability of frequency offset estimation is affected. The estimated single waveband frequency offsets of the optical comb lines of orders are classified into an estimated single waveband frequency offset of a low-mutation and high-order optical comb line and an estimated single waveband frequency offset of a high-mutation and high-order optical comb line, so that signal distortion of the classified estimated single waveband frequency offset of the low-mutation and high-order optical comb line is reduced, and therefore, reliability and accuracy of the frequency offset estimation are improved.

Step 103: Perform joint frequency offset estimation by using the estimated single waveband frequency offset of the low mutation optical comb line of each order, to obtain an estimated joint frequency offset.

The estimated joint frequency offset is a spacing between center frequencies of adjacent wavebands of signal light, that is, a difference between frequency spacings of optical comb lines of a transmitter and frequency spacings of optical comb lines of a receiver. The estimated joint frequency offset may be obtained by performing weighted average on the estimated single waveband frequency offset of the low mutation optical comb line of each order. The estimated joint frequency offset may also be obtained by performing weighted average on a difference between estimated single waveband frequency offsets of adjacent low order optical comb lines in the low mutation optical comb lines of orders.

The estimated joint frequency offset may be obtained by performing weighted average by using the following formula:

$$\Delta \hat{f} = \sum_m \alpha_m (\Delta f_m - \Delta f_{m-1})$$

where $\Delta \hat{f}$ indicates the estimated joint frequency offset, $\alpha_m$ indicates a weight value, and $\Delta f_m$ indicates an estimated single waveband frequency offset of an m-order low-mutation optical comb, where m indicates an order number of the optical comb line.

In a process of performing the joint frequency offset estimation, the estimated single waveband frequency offset of the high mutation optical comb line may also be added to the joint frequency offset estimation, as long as a corresponding weight value is set to 0.

In this embodiment, joint frequency offset estimation is performed on the estimated single waveband frequency offset of the low mutation optical comb line of each order, and compared with the prior art, frequency offset estimation is performed on more optical comb lines, which improves accuracy of frequency estimation and avoids instability caused by using the frequency offset estimation of the high mutation optical comb line, thereby improving accuracy of the frequency offset estimation and tolerance of a laser wavelength offset. In addition, because a frequency offset of an optical comb line is estimated by using a difference between frequency offsets of adjacent optical comb lines, the method can avoid an impact of the laser wavelength offset during the frequency offset estimation.

Step 104: Perform compensation for a frequency offset of a radio frequency drive signal by using the estimated joint frequency offset.

Because frequency offset estimation is performed on more optical comb lines, the obtained estimated joint frequency offset is more accurate and reliable. Therefore, by performing the compensation for the frequency offset of the radio frequency drive signal by using the estimated joint frequency offset, signal orthogonal frequency division multiplexing receiving can be better implemented. A weight value of weighted average during the joint frequency offset estimation indicates reliability of the frequency offset estimation of the optical comb line of each order.

Preferably, the method further includes step 105: repeat step 101 to step 104.

In this embodiment, the compensation for the frequency offset of the radio frequency drive signal is performed by repeating step 101 to step 104. During the repeating process, by performing the compensation for the frequency offset of the radio frequency drive signal, a frequency offset of an optical line generated by the optical comb generator becomes smaller, the mutation level of the curve of a single waveband frequency offset that is of the optical comb line and that changes with time becomes lower, and a quantity of low mutation optical comb lines becomes larger. After the joint frequency offset estimation, the compensation for the frequency offset of the radio frequency drive signal is more accurate and reliable.

As can be seen from the foregoing embodiment, optical comb lines are classified into a low mutation optical comb line and a high mutation optical comb line according to a mutation threshold of a curve of a single waveband frequency offset that changes with time and joint frequency offset estimation is performed on an estimated single waveband frequency offset of the low mutation optical comb line of each order, and compensation for a radio frequency drive signal is performed by using the joint frequency estimation, so that a quantity of optical comb lines for joint frequency offset estimation is increased, thereby avoiding performance deterioration caused by the fact that the high mutation optical comb line participates in the joint frequency offset estimation, and improving accuracy of compensation for a frequency offset of the radio frequency drive signal. In addition, in the method, compensation for the frequency offset of the radio frequency drive signal is performed repeatedly, so that frequency offsets are reduced, and therefore, reliability and comprehensiveness of the frequency compensation for the frequency offset of the radio frequency drive signal are improved.

Figure 2:
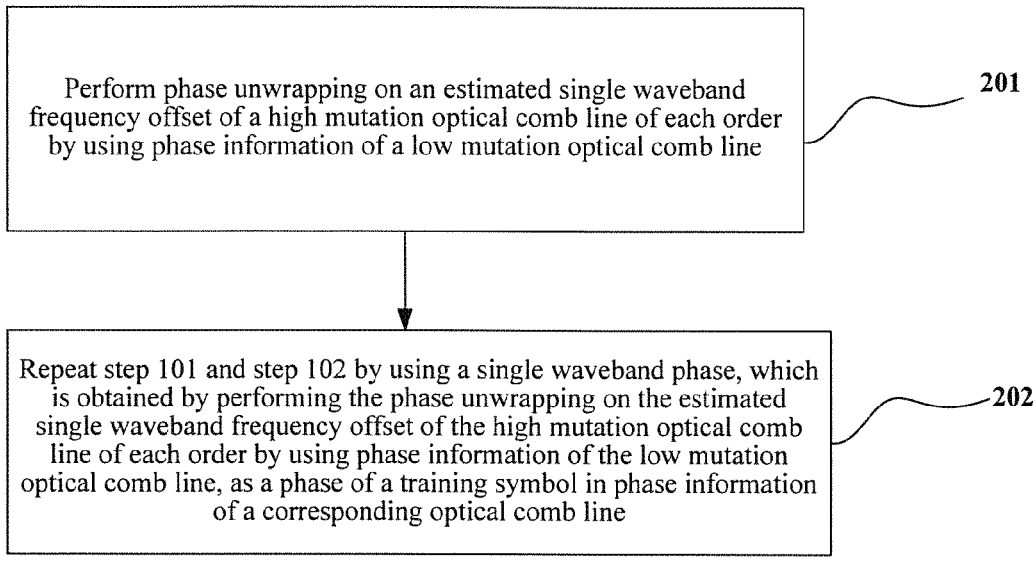
FIG. 2 is a flowchart of another embodiment of a frequency offset compensation method according to the present invention.

Referring to FIG. 2, FIG. 2 is a flowchart of another embodiment of a frequency offset compensation method according to the present invention, and this embodiment is described based on the foregoing embodiment.

After step 102, the method further includes:

Step 201: Perform phase unwrapping on the estimated single waveband frequency offset of the high mutation optical comb line of each order by using the phase information of the low mutation optical comb line.

The phase information of the low mutation optical comb line includes phase jump information of the low order optical comb line.

Because during the frequency offset estimation, wrapping of the high mutation optical comb line occurs, and the wrapping makes the curve of frequency offset estimation changing with time generate a large mutation. With a limited digital sampling frequency, frequently-generated large mutations cause serious signal distortion and affect reliability of the estimation. Therefore, the phase unwrapping needs to be performed on the estimated frequency offset of the high mutation optical comb line.

Because phase changes of the optical comb lines of orders are integer multiples of each other, unwrapping is performed on wrapping of a phase curve of the high mutation optical comb by using a phase curve of the low mutation optical comb, so as to eliminate the mutation in the frequency offset change curve, and therefore, reliability of the frequency offset estimation provided by the high mutation optical comb line is improved and the objective of participating in the joint estimation is achieved.

Step 202: Repeat steps S1 and S2 by using a single waveband phase, which is obtained by performing the phase unwrapping on the estimated single waveband frequency offset of the high mutation optical comb line of each order by using the phase information of the low mutation optical comb line, as the phase of the training symbol in the phase information of a corresponding optical comb line.

The phase curve is unwrapped by using a relationship between phases of the low mutation optical comb line and the high mutation optical comb line, and the frequency offset estimation is performed by taking a derivation, and after a mutation is smaller than the mutation threshold, the estimated value thereof is added to the joint estimation to calculate the frequency offset.

In this embodiment, in a process of continuous phase unwrapping, a quantity of estimated signal waveband frequency offsets of the high-mutation and high-order optical comb line is reduced, so that more estimated signal waveband frequency offsets of the optical comb lines participate in the joint frequency offset estimation, which improves the accuracy and the reliability of the frequency offset estimation of the radio frequency drive signal, so that the degree of compensation for a frequency offset of a radio frequency drive signal is more comprehensive and accurate.

Figure 3:
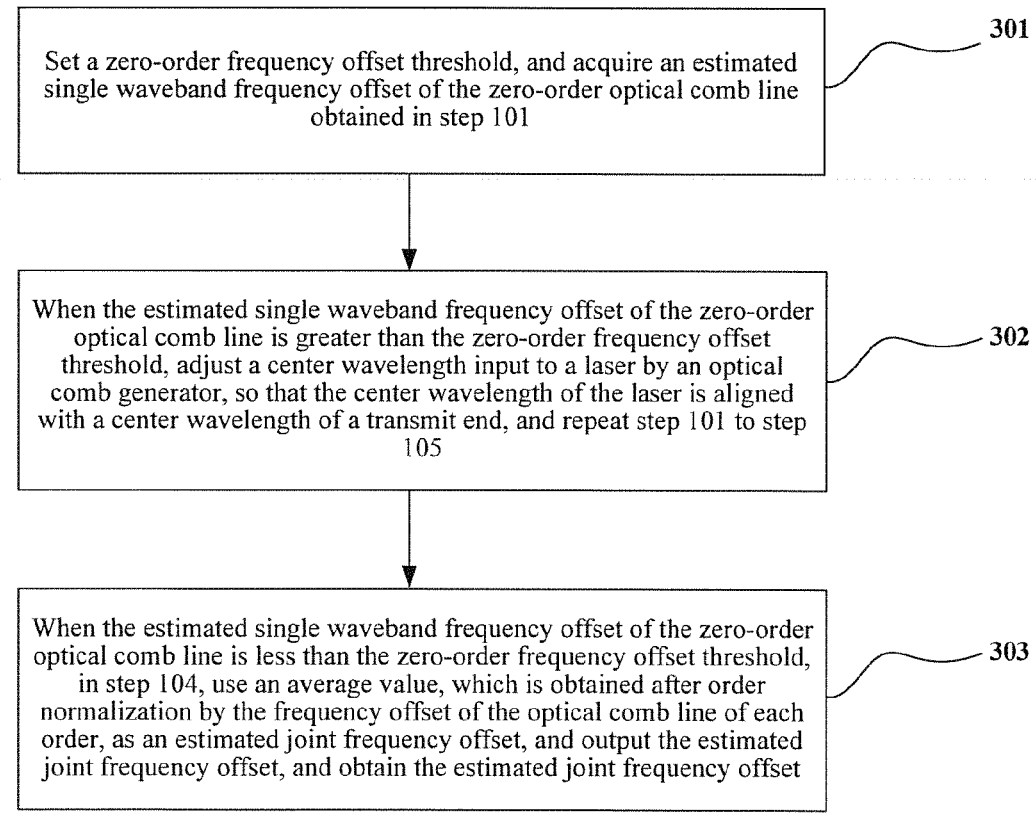
FIG. 3 is a flowchart of still another embodiment of a frequency offset compensation method according to the present invention.

Referring to FIG. 3, FIG. 3 is a flowchart of still another embodiment of a method for compensating for a frequency offset of a radio frequency drive signal according to the present invention, and this embodiment is described based on the foregoing embodiment.

Step 301: Set a zero-order frequency offset threshold, and acquire the estimated single waveband frequency offset of the zero-order optical comb line obtained in step 101.

Step 302: When the estimated single waveband frequency offset of the zero-order optical comb line is greater than the zero-order frequency offset threshold, adjust a center wavelength input to a laser by the optical comb generator, so that the center wavelength is aligned with a center wavelength of a transmit end, and repeat step 101 to step 105.

When the estimated single waveband frequency offset of the zero-order optical comb line is greater than the zero-order frequency offset threshold, it indicates that the center wavelength of the laser is misaligned; therefore, the laser is adjusted, and after the center wavelength of the laser is aligned, the estimation and compensation for the frequency offset of the radio frequency drive signal are performed again.

Step 303: When the estimated single waveband frequency offset of the zero-order optical comb line is less than the zero-order frequency offset threshold, in step 104, divide the estimated single waveband frequency offset of the low mutation optical comb line of each order by a corresponding order and add results to obtain the estimated joint frequency offset, that is, obtain the estimated joint frequency offset by using the following formula:

$$\Delta \hat{f} = \sum_m \frac{\Delta f_m}{m}$$

where $\Delta \hat{f}$ indicates the estimated joint frequency offset, $\Delta f_m$ indicates the estimated single waveband frequency offset of an m-order low mutation optical comb line, where m indicates an order number of the optical comb line, and $m \neq 0$, that is, the estimated frequency offset of the zero-order optical comb line no longer participates in the joint frequency estimation.

In this embodiment, the zero-order frequency offset threshold is set, and whether the center wavelength of the laser is aligned is determined according to the estimated single waveband frequency offset of the zero-order optical comb line, thereby effectively avoiding an error due to misalignment of the center wavelength of the laser.

In the frequency offset compensation method in this embodiment of the present invention, optical comb lines are classified into a low mutation optical comb line and a high mutation optical comb line according to a mutation threshold of a curve of a single waveband frequency offset that changes with time and joint frequency offset estimation is performed on an estimated single waveband frequency offset of the low mutation optical comb line of each order, and compensation for a radio frequency drive signal is performed by means of joint frequency estimation, so that a quantity of optical comb lines for joint frequency offset estimation is increased, thereby avoiding performance deterioration caused by that fact that the high mutation optical comb line participates in the joint frequency offset estimation, and improving accuracy of compensation for a frequency offset of the radio frequency drive signal. In addition, in the method, the compensation for the frequency offset of the radio frequency drive signal is performed repeatedly, so that frequency offsets are reduced gradually, and therefore, reliability and comprehensiveness of the frequency compensation for the frequency offset of the radio frequency drive signal are improved.

Figure 4:
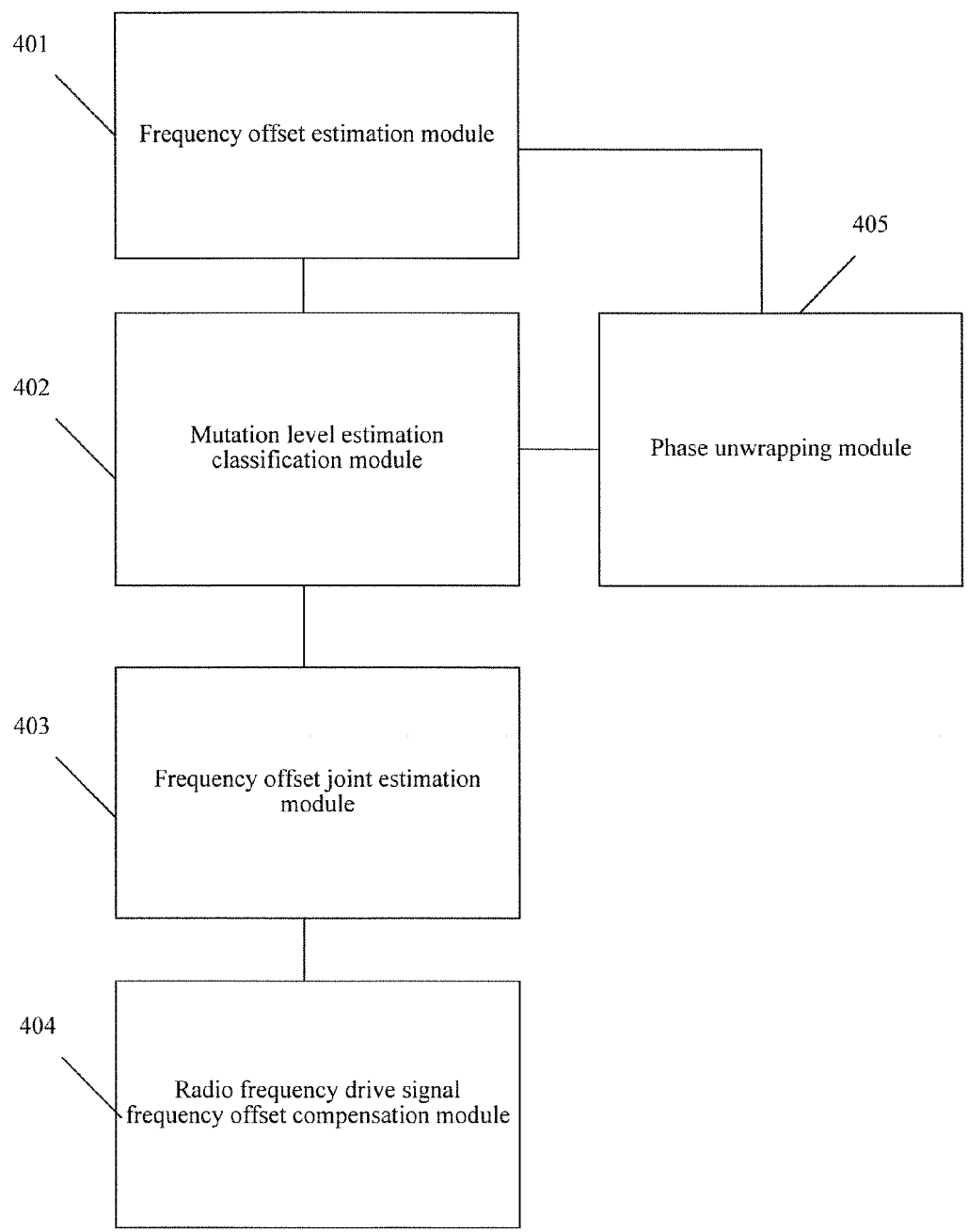
FIG. 4 is a schematic structural diagram of modules of an embodiment of a frequency offset compensation system according to the present invention.

Referring to FIG. 4, FIG. 4 is a schematic structural diagram of modules of an embodiment of a frequency offset compensation system according to the present invention, including:

a frequency offset estimation module 401, configured to perform single waveband frequency offset estimation on an optical comb line of each order to obtain an estimated single waveband frequency offset of the optical comb line of each order, where the optical comb line is a spectral line of an optical frequency comb;

a mutation level estimation classification module 402, configured to classify, according to a mutation threshold of a curve of a single waveband frequency offset that is of the optical comb line and that changes with time, an optical comb line whose mutation level of the curve of a single waveband frequency offset that changes with time is less than the mutation threshold as a low mutation optical comb line, and an optical comb line whose mutation level of the curve of a single waveband frequency offset that changes with time is greater than the mutation threshold as a high mutation optical comb line;

a joint frequency offset estimation module 403, configured to perform joint frequency offset estimation by using the estimated single waveband frequency offset of the low mutation optical comb line of each order, to obtain an estimated joint frequency offset; and a frequency offset compensation module 404 for a radio frequency drive signal, configured to perform compensation for a frequency offset of a radio frequency drive signal by using the estimated joint frequency offset.

Further, the frequency offset estimation module 401 performs single waveband phase estimation by using the optical comb line of each order and a beat frequency signal of a corresponding signal waveband, to obtain phase information of the optical comb line of each order; and takes a time derivative and performs time averaging on a phase of a training symbol in the phase information of the optical comb line of each order separately to obtain the estimated single waveband frequency offset of the optical comb line of each order.

Further, the mutation level estimation classification module 402 uses a quantity of mutations of a curve of a frequency offset that is of the optical comb line of each order per unit time and that changes with time as the mutation level of the curve of a single waveband frequency offset that is of the optical comb line of each order and that changes with time; and a value range of the mutation threshold of the curve of a single waveband frequency offset that changes with time is greater than two mutations in a frame and less than half of a quantity of information symbols included in a frame.

Further, when the mutation level estimation classification module 402 performs classification of the low mutation optical comb line and the high mutation optical comb line for the first time, if a mutation level of the curve of a single waveband frequency offset that is of the optical comb line of each order and that changes with time is greater than the mutation threshold of the curve of a single waveband frequency offset that is of the optical comb line and that changes with time, a zero-order optical comb line and ±1-order optical comb lines are classified as low mutation optical comb lines, and optical comb lines of other orders are classified as high mutation optical comb lines.

Further, the frequency offset compensation system further includes:

a phase unwrapping module 405, configured to perform phase unwrapping on the estimated single waveband frequency offset of the high mutation optical comb line of each order by using the phase information of the low mutation optical comb line, where a single waveband phase obtained by performing the phase unwrapping on the estimated single waveband frequency offset of the high mutation optical comb line of each order by using the phase information of the low mutation optical comb line is used as the phase of the training symbol in the phase information of a corresponding optical comb line and is sent to the frequency offset estimation module 401 for single waveband frequency offset estimation.

Further, the joint frequency offset estimation module 403 performs weighted average on the estimated single waveband frequency offset of the low mutation optical comb line of each order to obtain the estimated joint frequency offset.

Further, the joint frequency offset estimation module 403 performs weighted average on a difference between estimated single waveband frequency offsets of adjacent low order optical comb lines in the low mutation optical comb lines of orders to obtain the estimated joint frequency offset.

In FIG. 4, the frequency offset estimation module 401 is connected to the mutation level estimation classification module and the mutation level estimation classification module 402 is connected to the joint frequency offset estimation module 403; the joint frequency offset estimation module 403 is connected to the frequency offset compensation module 404 for a radio frequency drive signal, and the phase unwrapping module 405 is connected to the mutation level estimation classification module 402 and the joint frequency offset estimation module 401.

The frequency offset compensation system provided in this embodiment of the present invention is used to implement the method for compensating for a frequency offset of a radio frequency drive signal, and the specific principle of the system for compensating for a frequency offset of a radio frequency drive signal is the same as the principle of the method for compensating for a frequency offset of a radio frequency drive signal; therefore, no further details are provided herein again.

Figure 5:
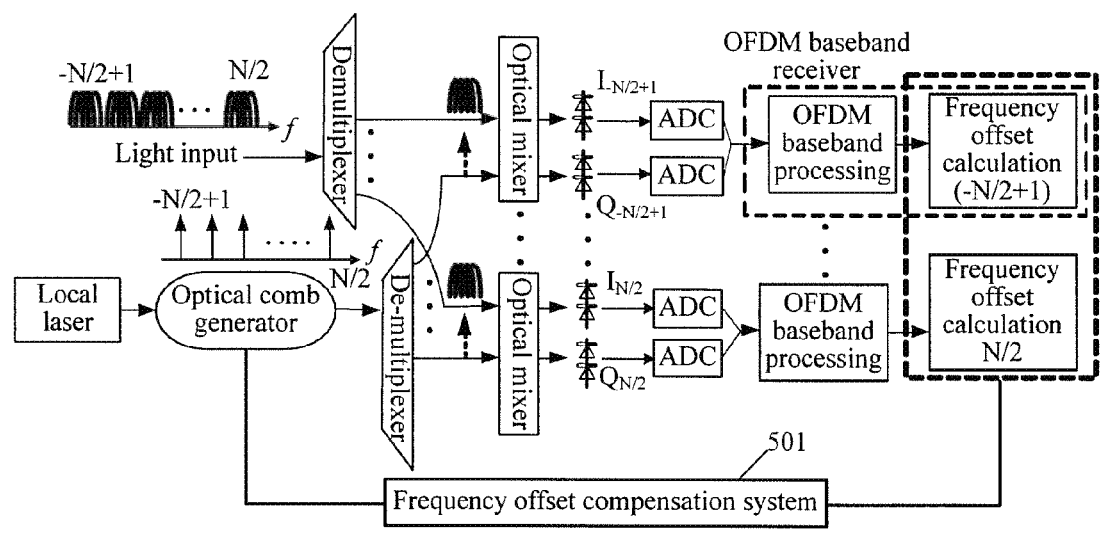
FIG. 5 is a structural diagram of an embodiment of a multi-waveband OFDM receiver according to the present invention.

Referring to FIG. 5, FIG. 5 is a structural diagram of an embodiment of a multi-waveband OFDM receiver according to the present invention, where the multi-waveband orthogonal frequency division multiplexing receiver includes the frequency offset compensation system 501 described in the foregoing embodiment.

In this embodiment, an optical comb generator using a radio frequency drive signal is compensated for by using the system 501 for compensating for a frequency offset of a radio frequency drive signal, which can effectively adjust a spacing between optical comb lines in the multi-waveband OFDM receiver, and reduce a residual frequency offset of the spacing between the optical comb lines in the multi-band OFDM receiver, so that the spacing between the optical comb lines in the multi-waveband OFDM receiver is the same as a spacing between optical comb lines in a transmitter, thereby ensuring normal work of coherent receiving.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, refer to these embodiments, and each embodiment focuses on a difference from other embodiments. Especially, a system embodiment is basically similar to a method embodiment, and therefore is described briefly; for related parts, refer to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A frequency offset compensation method for use to compensate for a frequency offset of a radio frequency drive signal of an optical comb generator of a multi-waveband OFDM receiver, the method comprising:

S1: performing single waveband frequency offset estimation on an optical comb line of each order to obtain an estimated single waveband frequency offset of the optical comb line of each order, wherein the optical comb line is a spectral line of an optical frequency comb;

S2: classifying, according to a mutation threshold of a curve of a single waveband frequency offset that is of the optical comb line and that changes with time, an optical comb line whose mutation level of the curve of a single waveband frequency offset that changes with time is less than the mutation threshold as a low mutation optical comb line, and an optical comb line whose mutation level of the curve of a single waveband frequency offset that changes with time is greater than the mutation threshold as a high mutation optical comb line;

S3: performing joint frequency offset estimation by using the estimated single waveband frequency offset of the low mutation optical comb line of each order, to obtain an estimated joint frequency offset; and S4: performing compensation for the frequency offset of the radio frequency drive signal by using the estimated joint frequency offset.

2. The method according to claim 1, wherein after S4, the method further comprises:
repeating S1 through S4.

3. The method according to claim 1, wherein S1 comprises:
performing single waveband phase estimation by using the optical comb line of each order and a beat frequency signal of a corresponding signal waveband, to obtain phase information of the optical comb line of each order; and
taking a time derivative and performing time averaging on a phase of a training symbol in the phase information of the optical comb line of each order separately to obtain the estimated single waveband frequency offset of the optical comb line of each order.

4. The method according to claim 3, wherein after S2, the method further comprises:
performing phase unwrapping on the estimated single waveband frequency offset of the high mutation optical comb line of each order by using the phase information of the low mutation optical comb line; and
repeating S1 and S2 by using a single waveband phase, which is obtained by performing the phase unwrapping on the estimated single waveband frequency offset of the high mutation optical comb line of each order by using the phase information of the low mutation optical comb line, as the phase of the training symbol in the phase information of a corresponding optical comb line.

5. The method according to claim 1, wherein:
in S2, the mutation level of the curve of a single waveband frequency offset that is of the optical comb line of each order and that changes with time indicates a quantity of mutations of a curve of a frequency offset that is of the optical comb line of each order per unit time and that changes with time; and
a value range of the mutation threshold of the curve of a single waveband frequency offset that changes with time is greater than two mutations in a frame and less than half of a quantity of information symbols comprised in a frame.

6. The method according to claim 1, wherein S2 comprises:

when classification of the low mutation optical comb line and the high mutation optical comb line is performed for the first time, if a mutation level of the curve of a single waveband frequency offset that is of the optical comb line of each order and that changes with time is greater than the mutation threshold of the curve of a single waveband frequency offset that is of the optical comb line and that changes with time, classifying a zero-order optical comb line and ±1-order optical comb lines as low mutation optical comb lines, and classifying optical comb lines of other orders as high mutation optical comb lines.

7. The method according to claim 1, wherein S3 comprises:
performing weighted average on the estimated single waveband frequency offset of the low mutation optical comb line of each order to obtain the estimated joint frequency offset.

8. The method according to claim 7, wherein performing weighted average on the estimated single waveband frequency offset of the low mutation optical comb line of each order to obtain the estimated joint frequency offset comprises:
performing weighted average on a difference between estimated single waveband frequency offsets of adjacent low order optical comb lines in the low mutation optical comb lines of orders to obtain the estimated joint frequency offset.

9. A frequency offset compensation system, comprising:
a frequency offset estimation module, configured to perform single waveband frequency offset estimation on an optical comb line of each order to obtain an estimated single waveband frequency offset of the optical comb line of each order, wherein the optical comb line is a spectral line of an optical frequency comb;
a mutation level estimation classification module, configured to classify, according to a mutation threshold of a curve of a single waveband frequency offset that is of the optical comb line and that changes with time, an optical comb line whose mutation level of the curve of a single waveband frequency offset that changes with time is less than the mutation threshold as a low mutation optical comb line, and an optical comb line whose mutation level of the curve of a single waveband frequency offset that changes with time is greater than the mutation threshold as a high mutation optical comb line;
a joint frequency offset estimation module, configured to perform joint frequency offset estimation by using the estimated single waveband frequency offset of the low mutation optical comb line of each order, to obtain an estimated joint frequency offset; and
a frequency offset compensation module for a radio frequency drive signal, configured to perform compensation for a frequency offset of a radio frequency drive signal by using the estimated joint frequency offset.

10. The system according to claim 9, wherein the frequency offset estimation module is configured to:
perform single waveband phase estimation by using the optical comb line of each order and a beat frequency signal of a corresponding signal waveband, to obtain phase information of the optical comb line of each order; and
take a time derivative and perform time averaging on a phase of a training symbol in the phase information of the optical comb line of each order separately to obtain the estimated single waveband frequency offset of the optical comb line of each order.

11. The system according to claim 10, wherein the frequency offset compensation system further comprises:
a phase unwrapping module, configured to perform phase unwrapping on the estimated single waveband frequency offset of the high mutation optical comb line of each order by using the phase information of the low mutation optical comb line, wherein a single waveband phase obtained by performing the phase unwrapping on the estimated single waveband frequency offset of the high mutation optical comb line of each order by using the phase information of the low mutation optical comb line is used as the phase of the training symbol in the phase information of a corresponding optical comb line and is sent to the frequency offset estimation module for single waveband frequency offset estimation.

12. The system according to claim 9, wherein:
the mutation level estimation classification module is configured to use a quantity of mutations of a curve of a frequency offset that is of the optical comb line of each order per unit time and that changes with time as the mutation level of the curve of a single waveband frequency offset that is of the optical comb line of each order and that changes with time; and
a value range of the mutation threshold of the curve of a single waveband frequency offset that changes with time is greater than two mutations in a frame and less than half of a quantity of information symbols comprised in a frame.

13. The system according to claim 9, wherein when the mutation level estimation classification module performs classification of the low mutation optical comb line and the high mutation optical comb line for the first time, if a mutation level of the curve of a single waveband frequency offset that is of the optical comb line of each order and that changes with time is greater than the mutation threshold of the curve of a single waveband frequency offset that is of the optical comb line and that changes with time, a zero-order optical comb line and ±1-order optical comb lines are classified as low mutation optical comb lines, and optical comb lines of other orders are classified as high mutation optical comb lines.

14. The system according to claim 9, wherein the joint frequency offset estimation module is configured to perform weighted average on the estimated single waveband frequency offset of the low mutation optical comb line of each order to obtain the estimated joint frequency offset.

15. The system according to claim 14, wherein the joint frequency offset estimation module is configured to perform weighted average on a difference between estimated single waveband frequency offsets of adjacent low order optical comb lines in the low mutation optical comb lines of orders to obtain the estimated joint frequency offset.

16. A frequency offset compensation system, comprising:
a memory; and
at least one processor coupled to the memory, the at least one processor being configured to:
perform single waveband frequency offset estimation on an optical comb line of each order to obtain an estimated single waveband frequency offset of the optical comb line of each order, wherein the optical comb line is a spectral line of an optical frequency comb,
classify, according to a mutation threshold of a curve of a single waveband frequency offset that is of the optical comb line and that changes with time, an optical comb line whose mutation level of the curve of a single waveband frequency offset that changes with time is less than the mutation threshold as a low mutation optical comb line, and an optical comb line whose mutation level of the curve of a single waveband frequency offset that changes with time is greater than the mutation threshold as a high mutation optical comb line,
perform joint frequency offset estimation by using the estimated single waveband frequency offset of the low mutation optical comb line of each order, to obtain an estimated joint frequency offset, and
perform compensation for the frequency offset of the radio frequency drive signal by using the estimated joint frequency offset.

17. The frequency offset compensation system of claim 16, wherein the at least one processor is further configured to:
perform phase unwrapping on the estimated single waveband frequency offset of the high mutation optical comb line of each order by using the phase information of the low mutation optical comb line, wherein a single waveband phase obtained by performing the phase unwrapping on the estimated single waveband frequency offset of the high mutation optical comb line of each order by using the phase information of the low mutation optical comb line is used as the phase of the training symbol in the phase information of a corresponding optical comb line and is sent to the frequency offset estimation module for single waveband frequency offset estimation.

* * * * *